(12) United States Patent
Tang et al.

(10) Patent No.: US 7,370,221 B2
(45) Date of Patent: May 6, 2008

(54) CPU FREQUENCY ADJUSTING SYSTEM AND METHOD

(75) Inventors: Gui-Hua Tang, Shenzhen (CN); Guang-Jian Wang, Shenzhen (CN); Yi-Ching Weng, Tu-Cheng (TW)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 498 days.

(21) Appl. No.: 11/025,809

(22) Filed: Dec. 28, 2004

(65) Prior Publication Data

US 2005/0210309 A1    Sep. 22, 2005

(30) Foreign Application Priority Data

Mar. 16, 2004    (TW)    .............................. 93106914 A

(51) Int. Cl.
*G06F 1/04*    (2006.01)
(52) U.S. Cl. ...................................... 713/501; 713/100
(58) Field of Classification Search ................ 713/501, 713/1, 100
See application file for complete search history.

(56) References Cited

U.S. PATENT DOCUMENTS 5,227,881 A * 7/1993 Wess et al. ................. 348/512
5,630,148 A * 5/1997 Norris ......................... 713/322
6,470,289 B1 * 10/2002 Peters et al. ................. 702/132
6,681,329 B1 * 1/2004 Fetkovich et al. ........... 713/189
7,100,068 B2 * 8/2006 Shyu .......................... 713/600

FOREIGN PATENT DOCUMENTS

DE    20302484 U1    9/2003

* cited by examiner

*Primary Examiner*—Thuan Du
(74) *Attorney, Agent, or Firm*—Morris Manning Martin LLP; Tim Tingkang Xia, Esq.

(57) ABSTRACT

A Central Processing Unit (CPU) frequency adjusting system has a multi-level architecture including an application level, a driver level, a hardware abstraction level, and a hardware platform. The application level includes a user interface (10) for generating a command signal to adjust a CPU frequency according to an input from a user, and displaying an adjusted CPU frequency. The hardware abstraction level includes a frequency adjusting module (130) for adjusting a current CPU frequency in a flash memory (14) with the new CPU frequency input by the user; and a data accessing module (131) for storing the adjusted CPU frequency in the flash memory, and reading the adjusted CPU frequency from the flash memory in order to display the adjusted CPU frequency on the user interface. The CPU frequency adjusting system can reduce the complexity of the hardware abstraction level, and is compatible with different types of BIOSs.

12 Claims, 2 Drawing Sheets

CPU FREQUENCY ADJUSTING SYSTEM AND METHOD

BACKGROUND OF THE INVENTION

1. Field of the Invention

The present invention relates to systems and methods for adjusting Central Processing Unit (CPU) parameters, and particularly to a system and method which can adjust a CPU's frequency.

2. Prior Art of the Invention

In order to save power and still allow users to conveniently use software applications, a Central Processing Unit (CPU) of a computer may be required to operate at different speeds (i.e., different frequencies) when performing various different types of tasks. For example, the CPU may operate at a lower speed when processing Microsoft Word documents, and may operate at a higher speed when processing images.

There are many technologies available to reduce power consumption by slowing down the operating speed of a CPU. For instance, U.S. Pat. No. 6,574,739 issued on Jun. 3, 2003 and entitled "Dynamic power saving by monitoring CPU utilization" discloses a method for conserving power. In this method, the CPU of a computer system is monitored, and the internal clock frequency or internal operating voltage of the CPU is dynamically adjusted, based on a perceived CPU processing load.

However, the equipment usually needed to support the above-described method is unduly complex. In addition, the method varies according to the types of BIOS programs being used and being introduced. That is, the method has poor currency and cross-BIOS compatibility.

Thus there is a need for a system and method which can overcome the abovementioned disadvantages.

SUMMARY OF THE INVENTION

Accordingly, a main objective of the present invention is to provide a system and method for readily adjusting the frequency of a Central Processing Unit (CPU).

To accomplish the above object, a CPU frequency adjusting system (hereinafter "the system") in accordance with a preferred embodiment of the present invention is provided herein. The system has a multi-level architecture including an application level, a driver level, a hardware abstraction level, and a hardware platform. The application level comprises a user interface and a Dynamic Link Library (DLL); the driver level comprises a driver model; the hardware abstraction level comprises a flash memory and a Basic Input/Output System (BIOS); and the hardware platform comprises a South Bridge and a Central Processing Unit (CPU). The user interface is provided for generating a command signal to adjust a CPU frequency according to an input from a user, and transmitting the command signal to the DLL. The DLL is for transmitting the command signal received from the user interface to the driver model. The driver model is for receiving the command signal, and transmitting the command signal to the BIOS. The flash memory is for storing the adjusted CPU frequency. The BIOS contains a frequency adjusting module and a data accessing module. The frequency adjusting module is operable for adjusting a frequency of a clock generator of a motherboard on which the CPU is mounted, and thereby adjusting the CPU frequency. The data accessing module is operable for storing the adjusted CPU frequency in the flash memory, and reading the adjusted CPU frequency from the flash memory in order to display the adjusted CPU frequency on the user interface. The South Bridge is for connecting the BIOS with the CPU. The CPU is for controlling the BIOS to implement the CPU frequency adjusting function.

The system of the present invention can reduce the complexity of the hardware abstraction level, and is compatible with different types of BIOSs.

Further, the present invention provides a CPU frequency adjusting method, the method comprising the steps of: (a) receiving from a user interface a new CPU frequency input by a user, and generating a command signal for adjusting a current CPU frequency stored in a flash memory; (b) receiving the command signal at a Dynamic Link Library; (c) receiving the command signal from the Dynamic Link Library at a driver model; (d) receiving the command signal from the driver model at a BIOS, and determining a validity of the new CPU frequency; (e) adjusting the CPU frequency if the new CPU frequency is valid; and (f) transmitting the adjusted CPU frequency to the user interface to be displayed to the user.

Other objects, advantages and novel features of the present invention will be drawn from the following detailed description of a preferred embodiment and preferred method of the present invention with the attached drawings, in which:

DETAILED DESCRIPTION OF THE PREFERRED EMBODIMENT

Figure 1:
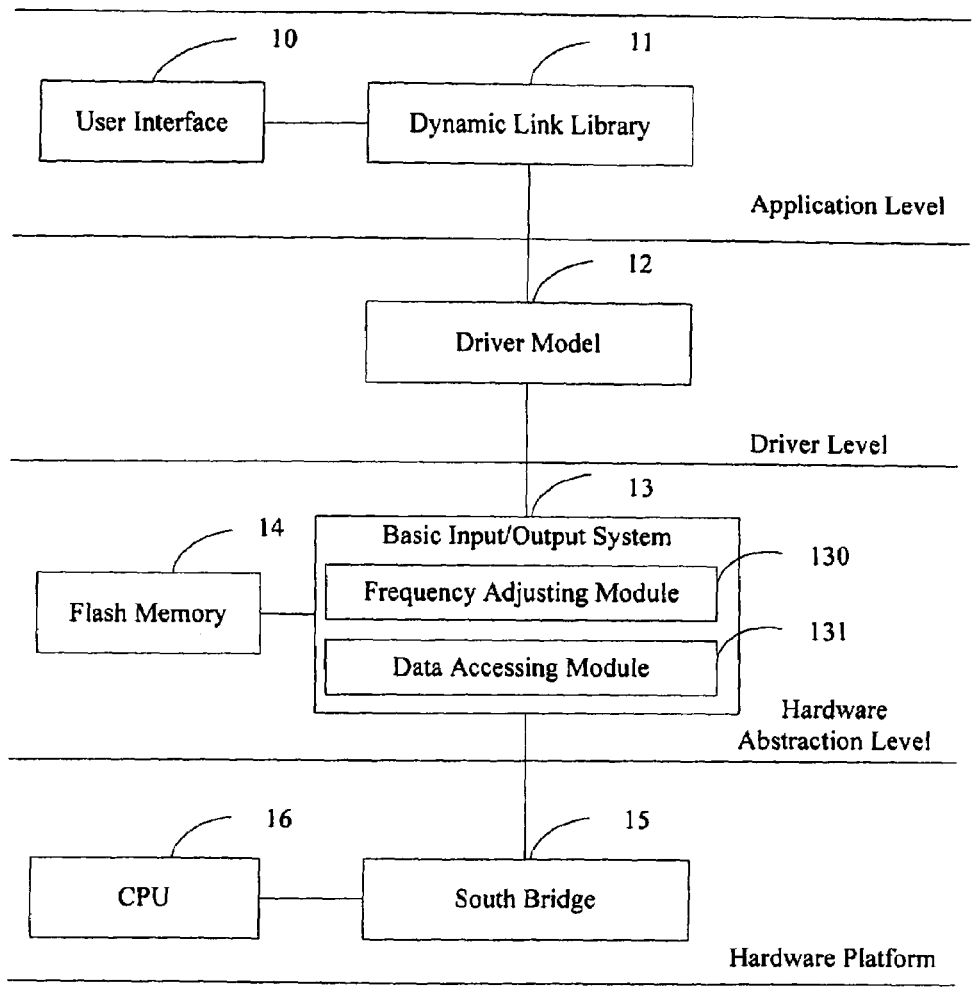
FIG. 1 is a schematic diagram of hardware and software infrastructure of the CPU frequency adjusting system in accordance with the preferred embodiment of the present invention.

FIG. 1 is a schematic diagram of hardware and software infrastructure of a Central Processing Unit (CPU) frequency adjusting system (hereinafter "the system") in accordance with the preferred embodiment of the present invention. The system has a multi-level architecture including an application level, a driver level, a hardware abstraction level, and a hardware platform. The application level comprises a user interface 10 and a Dynamic Link Library (DLL) 11. The driver level comprises a driver model 12. The hardware abstraction level comprises a Basic Input/Output System (BIOS) 13 and a flash memory 14. The BIOS 13 comprises a frequency adjusting module 130 and a data accessing module 131. The hardware platform comprises a South Bridge 15 and a CPU 16. The user interface 10 gives users a direct view for adjusting the frequency of the CPU 16. The user interface 10 is provided for generating command signals according to inputs from users, and transmitting the command signals to the DLL 11. The DLL 11 is for receiving the command signals from the user interface 10, and transmitting the command signals to the driver model 12. The driver model 12 is for receiving the command signals from the DLL 11, and transmitting the command signals to the BIOS 13. The frequency adjusting module 130 is for adjusting a frequency of a clock generator of a motherboard on which the CPU 16 is mounted according to the command signals, thereby adjusting the frequency of the CPU 16. The data accessing module 131 is for storing the adjusted CPU frequency in the flash memory 14, and reading from the flash memory 14 a current CPU frequency to be displayed on the user interface 10. The flash memory 14 is for storing the current CPU frequency. The South Bridge 15 connects the BIOS 13 and the CPU 16. The CPU 16 is for controlling the BIOS 13 to implement the function of adjusting the CPU frequency.

Figure 2:
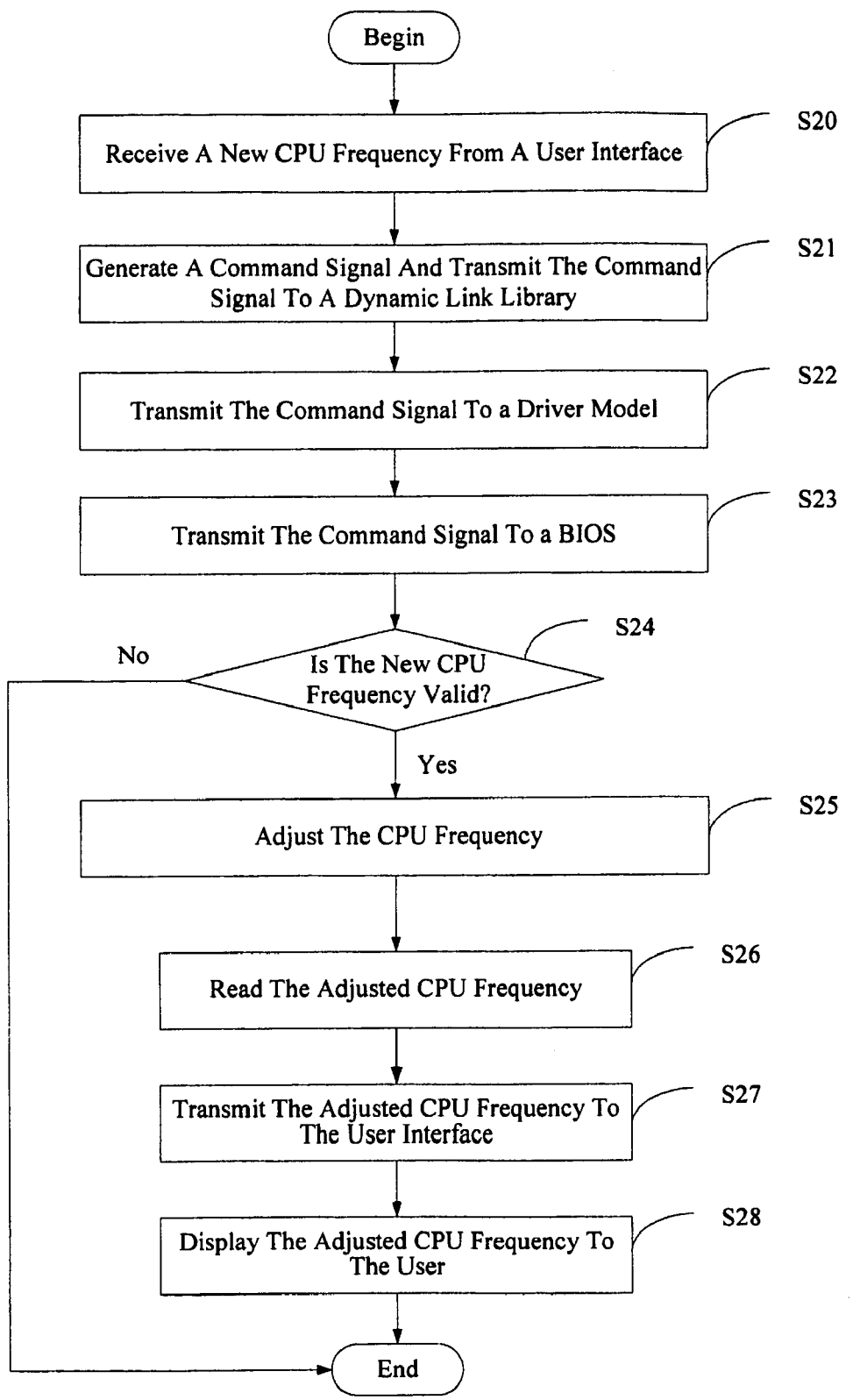
FIG. 2 is a flowchart of a preferred method for adjusting a CPU's frequency by utilizing the system of FIG. 1.

FIG. 2 is a flowchart of a preferred method for adjusting a CPU frequency by utilizing the system. In step S20, the user interface 10 receives a new CPU frequency input by a user. In step S21, the user interface 10 generates a command signal for adjusting the CPU frequency stored in the flash memory 14, and transmits the command signal to the DLL 11. In step S22, the DLL 11 transmits the command signal to the driver model 12. In step S23, the driver model 12 receives the command signal, and transmits the command signal to the BIOS 13. In step S24, the BIOS 13 determines whether the input CPU frequency is valid, by checking whether the CPU frequency falls within a preset range of CPU frequencies. Namely, the BIOS 13 determines whether the CPU frequency is in the range from a preset minimum frequency to a preset maximum frequency. If the CPU frequency is invalid, the procedure is finished. If the CPU frequency is valid, in step S25, the frequency adjusting module 130 adjusts a frequency of a clock generator of a motherboard on which the CPU 16 is mounted according to the command signal. Such adjustment by the frequency adjusting module 130 is performed under the control of the CPU 16 itself, and the CPU frequency is thus adjusted accordingly. The adjusted CPU frequency is stored in the flash memory 14. In step S26, the data accessing module 131 reads the adjusted CPU frequency from the flash memory 14. In step S27, the driver model 12 and the DLL 11 cooperate to transmit the adjusted CPU frequency to the user interface 10. In step S28, the user interface 10 displays the adjusted CPU frequency to the user.

The system of the present invention can reduce the complexity of the hardware abstraction level, and is compatible with different types of BIOSs.

Although the present invention has been specifically described on the basis of a preferred embodiment and preferred method, the invention is not to be construed as being limited thereto. Various changes and modification may be made to the embodiment and method without departing from the scope and spirit of the invention.

What is claimed is:

1. A Central Processing Unit (CPU) frequency adjusting system compnsing:
   an application level, comprising:
   a user interface for generating a command signal to adjust a CPU frequency according to an input from a user, and displaying an adjusted CPU frequency; and
   a Dynamic Link Library for receiving the command signal from the user interface;
   a driver level, comprising:
   a driver model for receiving the command signal from the Dynamic Link Library; and
   a hardware abstraction level, comprising:
   a flash memory for storing the adjusted CPU frequency; and
   a Basic Input/Output System (BIOS) for receiving the command signal from the driver model, the BIOS comprising:
   a frequency adjusting module for adjusting a frequency of a clock generator of a motherboard on which the CPU is mounted according to the command signal, thereby adjusting the CPU frequency; and
   a data accessing module for storing the adjusted CPU frequency in the flash memory, and reading the adjusted CPU frequency from the flash memory;
   wherein the driver model and the Dynamic Link Library cooperate to transmit the adjusted CPU frequency to the user interface for displaying the adjusted CPU frequency to the user.

2. The CPU frequency adjusting system according to claim 1, further comprising a hardware platform.

3. The CPU frequency adjusting system according to claim 2, wherein the hardware platform comprises a CPU, the CPU having its frequency adjusted by the CPU frequency adjusting system, and the CPU being for controlling the BIOS to implement the function of adjusting the CPU frequency.

4. The CPU frequency adjusting system according to claim 3, wherein the hardware platform further comprises a South Bridge connecting the CPU with the BIOS.

5. The CPU frequency adjusting system according to claim 1, wherein the BIOS is further for determining a validity of a new CPU frequency input from the user.

6. The CPU frequency adjusting system according to claim 5, wherein the BIOS determines the validity of the new CPU frequency by checking whether the CPU frequency falls within a preset range of CPU frequencies.

7. A Central Processing Unit (CPU) frequency adjusting method, comprising the steps of:
   receiving from a user interface a new CPU frequency input by a user, and generating a command signal for adjusting a current CPU frequency;
   receiving the command signal at a Dynamic Link Library;
   receiving the command signal from the Dynamic Link Library at a driver model;
   receiving the command signal from the driver model at a Basic Input/Output System (BIOS), and determining a validity of the new CPU frequency;
   adjusting the CPU frequency if the new CPU frequency is valid; and
   transmitting the adjusted CPU frequency to the user interface through the driver model and the Dynamic Link Library, and displaying the adjusted CPU frequency on the user interface.

8. The CPU frequency adjusting method according to claim 7, wherein the BIOS determines the validity of the CPU frequency by checking whether the new CPU frequency falls within a preset range of CPU frequencies.

9. The CPU frequency adjusting method according to claim 7, wherein the CPU frequency is adjusted by adjusting a frequency of a clock generator of a motherboard on which the CPU is positioned.

10. A method for adjusting frequency of Central Processing Units (CPUs), comprising the steps of:
    retrieving a new input of said CPU frequency from a user interface;
    generating a command signal for adjusting said CPU frequency according to said new input;
    receiving said command signal at a Dynamic Link Library;
    receiving said command signal from said Dynamic Link Library at a driver model;
    transmitting said command signal to a Basic Input/Output System (BIOS) through said driver model; and
    adjusting said CPU frequency to said new input according to said command signal.

11. The method according to claim 10, further comprising the step of retrieving a current value of said CPU frequency after said adjusting step to readably display in said user interface.

12. The method according to claim 10, further comprising the step of identifying validity of said new input to become a workable value of said CPU frequency.

* * * * *